United States Patent [19]

Newington et al.

[11] 3,980,928

[45] Sept. 14, 1976

[54] FIRE DETECTORS

[76] Inventors: Timothy J. Newington, 70 Greenfield Road, Greenside; Lourens P. Swanepoel, 194 Randbourne, Mondeor, both of Johannesburg, South Africa

[22] Filed: July 22, 1974

[21] Appl. No.: 490,781

[30] Foreign Application Priority Data

July 23, 1973 South Africa ........................ 73/4995

[52] U.S. Cl. ................................ 317/10; 317/18 C; 313/54

[51] Int. Cl.[2] ........................................... H02H 3/16

[58] Field of Search .................. 317/10, 18 C, 18 D; 340/237 S, 248 N; 250/385, 382, 405, 428, 435; 313/54, 268; 174/140 R

[56] References Cited

UNITED STATES PATENTS

| | | | |
|---|---|---|---|
| 3,529,201 | 9/1970 | Rudolph | 313/268 |
| 3,666,954 | 5/1972 | Sasaki et al. | 313/54 X |
| 3,824,422 | 7/1974 | Van der Walt et al. | 313/54 X |

*Primary Examiner*—J D Miller
*Assistant Examiner*—Patrick R. Salce
*Attorney, Agent, or Firm*—Haseltine, Lake & Waters

[57] ABSTRACT

A fire detector of the type including a smoke chamber and a grid supported in the chamber on an insulating element. In order to prevent the flow of leakage currents from the grid to the body of the chamber an electrically-conductive element is arranged around the insulating element in circumferential contact therewith. The electrically-conductive element is arranged to be at the same potential as the grid so that no leakage currents are able to flow from the grid to the body of the chamber.

1 Claim, 1 Drawing Figure

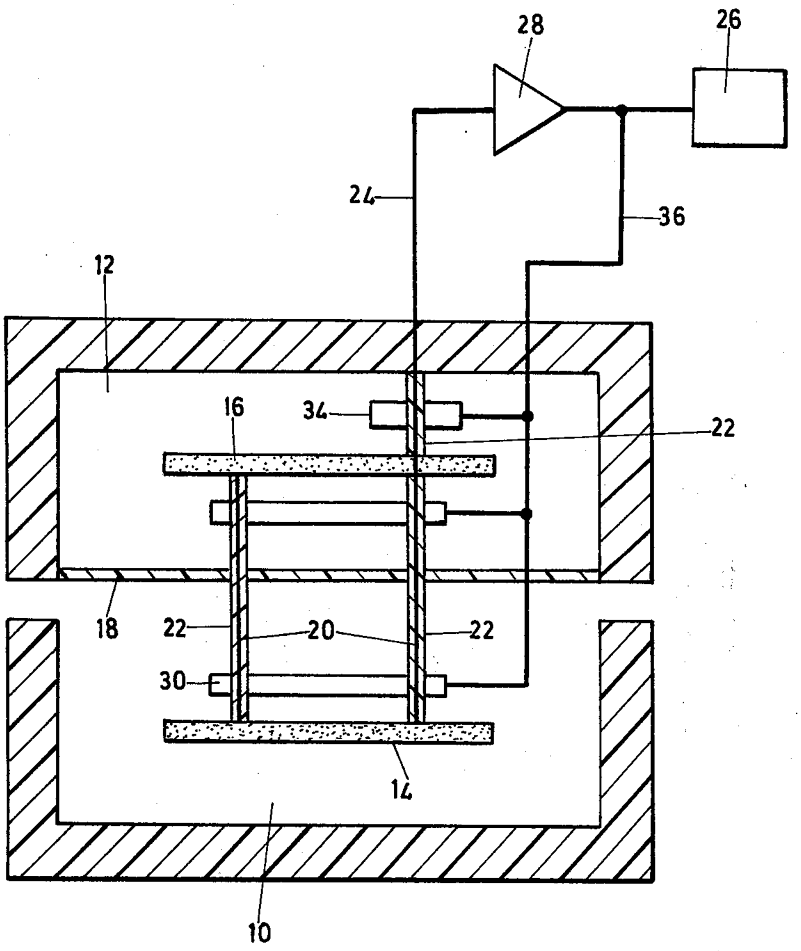
28
26
24
36
12
16
34
22
18
22
20
22
30
14
10

FIRE DETECTORS

This invention relates to fire detectors of the type used on mines and similar installations for detecting the outbreak of a fire.

The conventional fire detector comprises a housing having a first chamber known as a smoke chamber and a second chamber known as a reference chamber.

Conventional fire detectors are high impedance devices (their operating current is of the order of $10^{-9}$ amps) and it is absolutely essential that there be no leakage currents from the grid to some other part of the detector failing which the performance of the detector can be radically affected. This is unfortunately not the case in most detectors as minute leakage currents frequently flow between the grids and some other part of the detector via the insulating structure which holds the grids in position. The leakage currents either flow through the body of the insulating structure or over its surface (e.g. when there is dirt or moisture on the insulating structure.)

It is an object of the present invention to provide a fire detector in which the problem of leakage currents is eliminated in a novel manner.

A fire detector according to the invention includes a smoke chamber adapted to be at a first electrical potential, at least one element made of an insulating material located in and attached to the chamber, an electrical grid located in the chamber and supported therein by the insulating element, the grid being adapted to be at a second electrical potential, and at least one electrically conductive element surrounding the insulating element and circumferentially in contact therewith, the electrically conductive element being adapted to be at the second electrical potential to prevent leakage currents from the grid to the chamber via the insulating element.

Further according to the invention the grid is supported in the chamber by a plurality of the insulating elements, and each insulating element has one of the electrically conductive elements fitted to it.

Further according to the invention the grid is connected to an electronic unit in a manner known per se through an impedance converter, and the electrically conductive element is connected to the output of the impedance converter.

To illustrate the invention an embodiment thereof is described hereunder with reference to the accompanying drawing which is a diagrammatic sectional elevation of the fire detector of the invention.

With reference to the drawing the fire detector comprises basically a smoke chamber 10 and a reference chamber 12. The chambers are preferably made of an electrically-conductive plastic material. The two chambers are usually connected across a suitable power supply in a known manner.

Electrical grids 14 and 16 are located in the two chambers respectively and supported therein by a structure 18 made of some suitable insulating material. The two grids are inter-connected by conductors 20 which are, in turn, surrounded by insulating strips 22. Further conductors 24 connect the grids to the electronic unit 26 known per se which is usually associated with detectors of this type. The first section of the electronic unit 26 usually consists of an impedance converter 28 having unity voltage gain.

The problem of leakage currents is largely eliminated in the present invention by interrupting the leakage current paths. This is achieved by surrounding each of the insulating strips 22 with electrically conductive guard rings 30, 32 and 34 tracked to the same potential of the grids. The guard rings snugly surround the insulating strips so as to be in circumferential contact therewith.

Guard ring 30 surrounds the insulating strips 22 between the supporting structure 18 and the lower grid 14. Guard ring 32 surrounds the insulating strips 22 between the supporting structure and the upper grid 16. Guard ring 34 surrounds the insulating strip 22 between the upper grid 16 and the body of the reference chamber 12.

The guard rings are tracked to the same potential of the grids by connecting the guard rings to the output of the impedance coverter 28 via the conductor 36.

Since the guard rings will be at the same potential as the grids it follows that no leakage currents will be able to flow between the grids and the bodies of the chambers via the insulating strips 18.

The guard rings are preferably also made of electrically-conductive plastic material.

The patent to Van der Walt et al. U.S. Pat. 3,834,422 describes the details and operation of a detector using an ionizing radioactive source. The manner in which the smoke particles effect the ionization current in the smoke chamber are also described in this patent.

We claim:

1. A fire detector including a smoke chamber adapted to be at a first electrical potential, at least one element made of an insulating material located in and attached to the chamber, an electrical grid located in the chamber and supported therein by the insulating element, the grid being adapted to be at a second electrical potential, and at least one electrically conductive element surrounding the insulating element and circumferentially in contact therewith, the electrically conductive element being adapted to be at the second electrical potential to prevent surface leakage currents from the grid to the chamber via the insulating element, said detector comprising a single chamber detector, the grid being supported in the chamber by a plurality of the insulating elements, each insulating element having one of the electrically conductive elements fitted to it, said grid being connected to an electronic unit through an impedance converter, the electrically conductive element being connected to the output of the impedance converter.

* * * * *